United States Patent
Nie

(10) Patent No.: US 7,185,184 B1
(45) Date of Patent: Feb. 27, 2007

(54) PROCESSOR SYSTEM, ESPECIALLY A PROCESSOR SYSTEM FOR COMMUNICATIONS DEVICES

(75) Inventor: Xiaoning Nie, Munich (DE)

(73) Assignee: Infineon Technologies AG, Munich (DE)

( * ) Notice: Subject to any disclaimer, the term of this patent is extended or adjusted under 35 U.S.C. 154(b) by 425 days.

(21) Appl. No.: 10/089,907

(22) PCT Filed: Oct. 5, 2000

(86) PCT No.: PCT/EP00/09741

§ 371 (c)(1),
(2), (4) Date: Jul. 9, 2002

(87) PCT Pub. No.: WO01/25902

PCT Pub. Date: Apr. 12, 2001

(30) Foreign Application Priority Data

Oct. 6, 1999 (DE) ................. 199 48 099

(51) Int. Cl.
G06F 9/44 (2006.01)
G06F 15/17 (2006.01)

(52) U.S. Cl. ................... 712/225; 712/226

(58) Field of Classification Search ........... 712/9, 712/18, 23, 219, 212, 225, 226; 370/389; 709/236

See application file for complete search history.

(56) References Cited

U.S. PATENT DOCUMENTS

| | | | |
|---|---|---|---|
| 4,196,470 A * | 4/1980 | Berg ................. | 710/260 |
| 5,027,317 A * | 6/1991 | Pepera et al. ......... | 711/163 |
| 5,146,558 A * | 9/1992 | Inoue .................. | 345/531 |
| 5,179,530 A | 1/1993 | Genusov et al. ...... | 364/726 |
| 5,442,750 A * | 8/1995 | Harriman et al. ..... | 709/223 |
| 5,559,986 A * | 9/1996 | Alpert et al. ......... | 711/144 |
| 5,598,362 A | 1/1997 | Adelman et al. ..... | 364/736 |
| 5,634,131 A * | 5/1997 | Matter et al. ......... | 713/322 |
| 5,655,124 A | 8/1997 | Lin .................. | 395/750.04 |
| 5,732,251 A | 3/1998 | Bartkowiak .......... | 395/562 |
| 5,841,771 A * | 11/1998 | Irwin et al. .......... | 370/360 |
| 5,954,811 A | 9/1999 | Garde ................ | 712/35 |

FOREIGN PATENT DOCUMENTS

| | | |
|---|---|---|
| EP | 0 529 913 A2 | 3/1993 |
| EP | 0 767 425 A2 | 4/1997 |
| JP | 0050020062 | 1/1993 |

OTHER PUBLICATIONS

Georg Schnurer: "Der Herausforderer; DECs neuer Alpha-Chip attackiert den Pentium", George Schnurer, c't 1994, No. 3, pp. 88-92.

* cited by examiner

Primary Examiner—Daniel H. Pan
(74) Attorney, Agent, or Firm—Peter F. Corless; Steven M. Jensen; Edwards Angell Palmer & Dodge LLP

(57) ABSTRACT

The invention relates to a processor system which is configured as a communications controller and which comprises a central processor unit (1) for executing instructions filed in a program memory (8), whereby the processor unit (1) comprises only one path (2,3) for reading out an instruction from the program memory (8) and for decoding the instruction. In addition, several parallelly operable execution paths (4,5;6,7) for parallelly executing different program flows are provided which each access the path (2,3) jointly used for reading out and decoding an instruction.

10 Claims, 2 Drawing Sheets

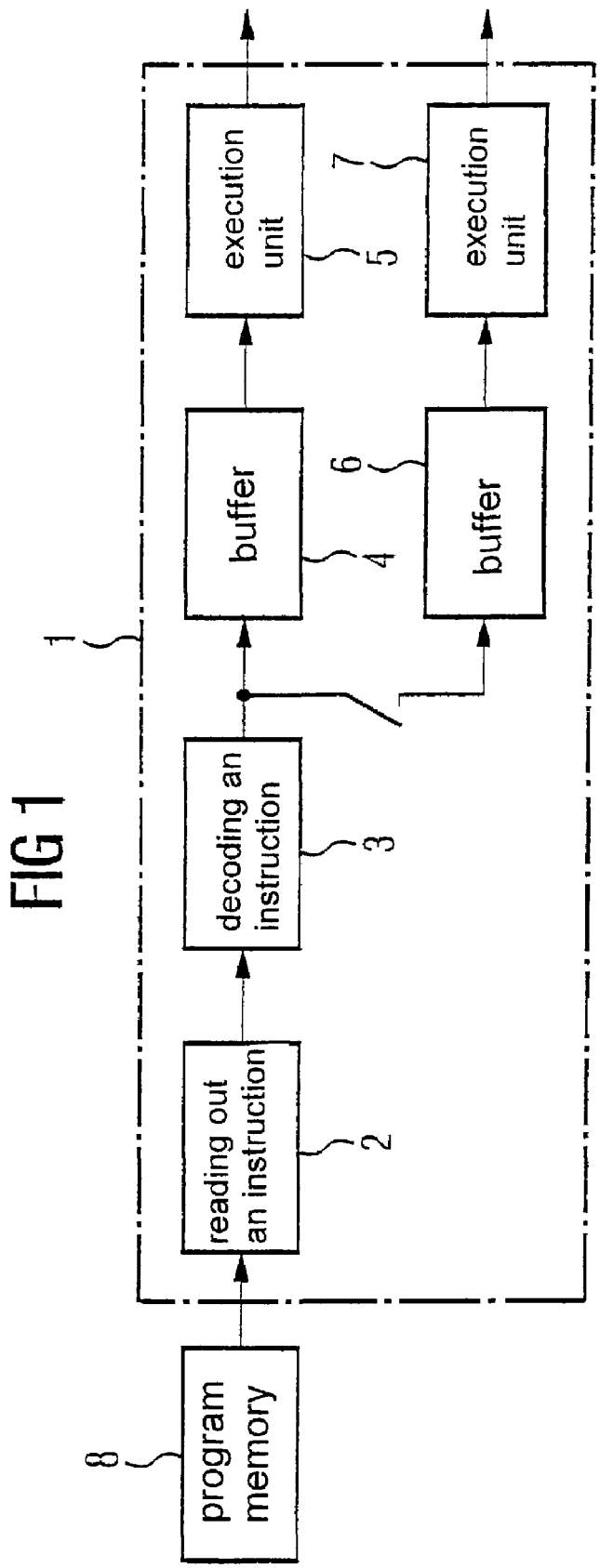

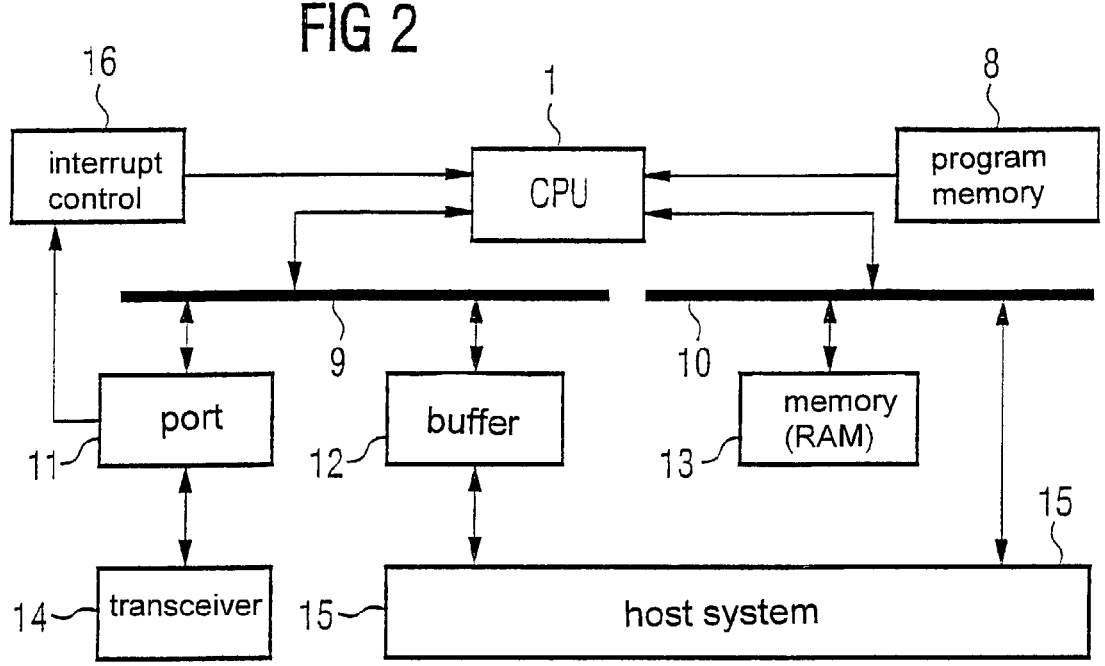
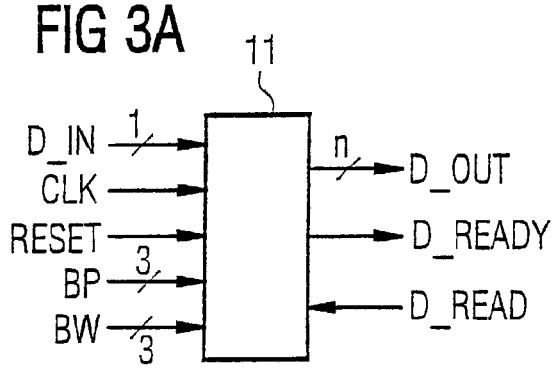
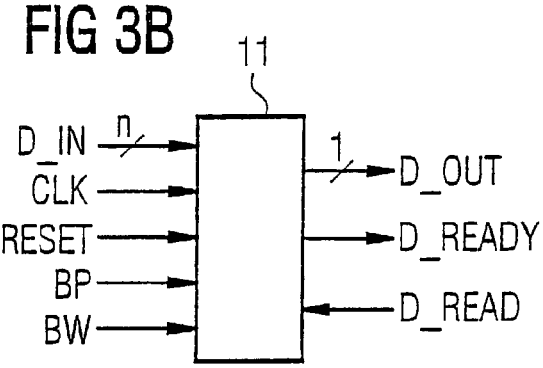
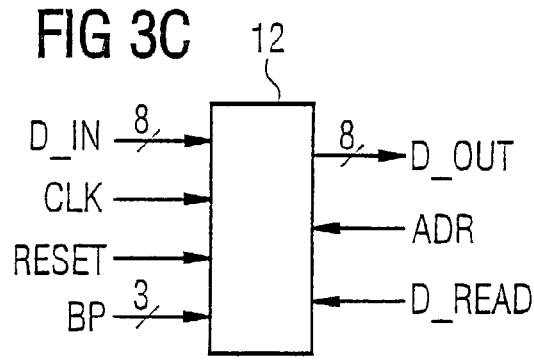

PROCESSOR SYSTEM, ESPECIALLY A PROCESSOR SYSTEM FOR COMMUNICATIONS DEVICES

Communications controllers are used in communication transmitters, routers or gateways, which for the sake of simplicity are described below as host systems. Normally receiving and transmitting communication information is managed or controlled with the aid of the communications controllers. For transmission the communication information present in the form of digital data is collected from a buffer and subsequently, possibly packaged with further information bits, written to a transmission buffer. The content of the transmission buffer is subsequently forwarded to a modulator or transceiver, which modulates the digital transmission data onto a carrier signal, converts it from digital to analogue and tranmits it via a communications channel to a receiver.

The communication information is processed in agreement with so-called communications protocols, which are structured in the form of layers, individually described as "layer". In the transmitting direction the input data of the particular layer must be packaged with a so-called protocol header in each layer and forwarded to the subordinate layer. In the receiving direction on the other hand the particular input data must be extracted from the protocol header and the data must be forwarded to the superior layer in each case. Therefore as well as evaluating and executing control instructions for example externally fed via a host computer or microcontroller the main objectives of a communications controller are to extract the header information from an incoming bitstream, to insert the header information in a bitstream to be transmitted and to forward the particular data to another layer (i.e. the data transfer).

With regard to the architecture of communications controllers various proposals are known, which essentially can be characterised by the central processor unit (CPU), the memory structure, the bus structure or the instruction set used in each case. Typical communications controller architecture is described for example in "A 16 Mb/s Adapter Chip for the IBM Token-Ring Local Area Network", J. D. Blair et. al., IEEE Journal of Solid-State Circuits, vol. 24, December 1989. The data transfer detailed above often represents a bottleneck in the communications controller. In the case of the known architecture previously mentioned this results in the changeover from one program sequence to another program sequence, also described as "task switch", taking a relatively long time.

For this reason communications controllers have been proposed, the architecture of which enables various instructions or program sequences to be processed in parallel. Thus for example in the U.S. Pat. No. 5,434,976 a communications controller is proposed, which has two central processor units (CPU's) independent of each other, each processor unit possessing its own path for collecting or reading out an instruction to be executed and for decoding and executing the read out instruction. Essentially the function of the so-called MAC-layer ("Medium Access Control") is performed with the aid of one of the processor units while the other processor unit essentially executes host instructions and handles the buffer memory functions associated with receiving or transmitting data.

Although it is possible with the aid of this known architecture to efficiently process the communication information, especially to transfer data relatively quickly, this architecture has the disadvantage that two separate processor units are required, which increases the necessary chip space as well as the power consumption.

The object of the present invention is therefore based on proposing a processor system, which on the one hand has minimal chip space requirement and power consumption and on the other hand makes it possible for the functions needed for processing communication information to be executed quickly and efficiently.

This object is achieved according to the invention by a processor system with the features of claim 1. The subclaims define preferred and advantageous embodiments of the present invention.

The processor system according to the invention in particular designed in the form of a communications controller only has one central processor unit (CPU) to execute instructions stored in a program memory, the processor unit having a single path for reading out an instruction from the program memory and for decoding the read out instruction. In addition several execution paths operable in parallel are provided for parallel execution of various instructions or program sequences, which each access the path used jointly for reading out and decoding an instruction.

In this way the parallel processing of different program sequences is possible in principle, whereby the chip space requirement and power consumption can be minimised owing to the path being used jointly for reading out and decoding the instructions.

It is advantageous if only one of the execution paths performs the normal computing and addressing functions of the CPU while another execution path only carries out certain special functions, so that this execution path can be implemented more simply and the complexity of design can be further reduced. It is particularly advantageous if the latter execution path can only execute one particular frequently required function, whereby during the processing of communications protocols this can for example be the movement of data blocks, i.e. the data transfer.

To move, i.e. load or store, data blocks the instruction set of the processor system can be advantageously expanded in such a way that with the corresponding "block move" instruction a programmable offset value is pre-set at the same time, as the result of which the data block for example is written to an output port or read out from an input port. In this case in particular a bitoffset can be used as offset value.

By using databuses with different transmission rates less frequently required or slower functions can be executed on the databus at the lower transmission rate, while functions which are required more frequently or those to be executed quickly, as for example in particular data transfers, can be executed via the databus at the higher transmission rate. This embodiment according to the invention is therefore different from the known solutions, which either propose the use of an individual databus in combination with a single processor unit or the use of two separate databuses in combination with two separate processor units.

In the case of a communications controller of the so-called payload data can be quickly transferred in this way on the databus provided with sufficient bandwidth, having the higher transmission rate, while the protocol-header data is processed by the slower databus.

Further advantages of the present invention, which result from the previously described architecture of the processor system according to the invention, are amongst others the use of different bitwidths for the individual databuses and a heterogeneous memory hierarchy for the ports, registers and RAM-data memory of the processor system as well as the possibility of implementing different energy saving modes for each execution path and each databus.

The present invention is explained in more detail below with reference to the attached drawing by way of preferred embodiments.

FIG. 1 shows a simplified block diagram of a central processor unit or central unit (CPU) according to one embodiment of the present invention, FIG. 2 shows the use of the processor unit shown in FIG. 1 with a processor system according to the invention, and FIGS. 3A–3C show enlarged illustrations of the input/output ports and registers illustrated in FIG. 2.

As shown in FIG. 1, the processor unit 1 (CPU) serving as communications controller for example of a communication transmitter includes a path for reading out and decoding an instruction from a program memory 8 of the processor system, which is illustrated in FIG. 1 in the form of function blocks 2 and 3.

In order to optimise the data transfer to be executed during the processing of communication data as well as the protocols, instructions can be executed in parallel, parallelity only being present after the function blocks 2 and 3 and as the result of several executing units 5, 7 operable in parallel. Especially in the case of the embodiment shown in FIG. 1 two such parallel executing units 5, 7 are provided for independently processing various instructions or program sequences, a buffer memory or register 4 or 6 being associated with each executing unit after the decoding step 3. These buffer memories 4, 6 in each case serve to store information, which the following executing unit 5 or 7 requires to carry out the instructions.

According to the architecture shown in FIG. 1 therefore only a single path 2, 3 which is used jointly by all executing units 5, 7 operable in parallel, is required for collecting or reading out and decoding an instruction, resulting in more simple implementation and programming.

The executing units 5 and 7 are advantageously designed or structured differently. One of these executing units should be structured as simply as possible to reduce the complexity of design, so that only a limited number of functions or instructions can be executed, while at least one other executing unit can be kept as general as desired and in particular able to execute all possible functions or instructions. In the case of the embodiment illustrated the executing unit 7 is even simplified to such an extent that it is only designed to execute one particular instruction, preferably the instruction to move a datablock, while the executing unit 5 can execute the entire instruction set of the processor system. In this way the structure of the bufffer 6 and the executing unit 7 can be simplified in comparison to the structure of the buffer 4 and the executing unit 5.

As already mentioned the buffers 4 and 6 each serve to temporarily store information, which is needed for executing the instruction to be carried out in the particular execution path. When instructions which last several cycles are executed (as for example in the case of a data block movement instruction), the information needed in each case is stored in the buffers 4 or 6 in order in this way to make the path with the function blocks 2 and 3 free for parallel execution of another instruction. If the executing unit 7 only serves to execute the instruction to move a datablock, only a bit to differentiate between a loading and a storage instruction, the address of the data source or data sink, the number of the data elements to be moved (for example bytes) as well as possible subsequent offset information, explained in detail below (for example bit offset information), must be stored in the corresponding buffer 6.

If the executing unit 7 is active for executing a data transfer, the execution path of the executing unit 5 can be accessed in parallel with a further program sequence ("task"). Its own state variables, which form the structural space of the particular program sequence also described as "context", are associated with each program sequence. Separate hardware, such as for example program counters and registers to store the particular state variables (zero bits, carry bits, address pointers etc.) should be provided for each active program sequence, so that when one program sequence is changed over to another the hardware present in each case is switched over with the corresponding state variables and the context can be changed over without loss of cycle.

For so-called multitasking or parallel operation a set of instructions is necessary which amongst others includes instructions for starting and stopping a program sequence, giving specific priority to a program sequence or waiting for a signal concerning program sequence synchronisation. If the executing unit 5 has no further instructions to execute, it is intended that the entire path from function block 2 as far as function block 5 as well as the corresponding register for the state variables can be switched off, which likewise can result from an explicit instruction for switching off the clock.

Since each of the two executing units 5, 7 are associated with different program sequences, communication between the ALU ("Algorithmic Logical Unit"), the registers, RAM-memories and databus etc. of the processor system is simplified. Since the data of a program sequence in the executing unit 7 can be transferred in parallel to another program sequence, which is processed by the executing unit 5, in contrast to a DMA-based processor system ("Direct Memory Access"), better control can also be achieved within the software if the data movement instruction has had to be interrupted. In addition no management of DMA controllers is required, which contributes to reducing the program code and power requirement. Also hardware costs are minimised, since the registers or buffers 4, 6 can be used several times and no extra registers are necessary for the DMA controllers.

As already mentioned, preferably the executing unit 7 only serves to execute a datablock movement instruction, while the executing unit 5 can be designed as generally as possible, so that all possible functions or instructions can be executed. During processing of communication data the executing unit 7 can therefore be used for executing data transfers, while the executing unit 5 in parallel with this performs the rest of the protocol processing. Since the data transfers must be run relatively quickly in comparison to protocol processing, it is advantageous to connect the executing unit 7 to a databus with a relatively high transmission rate. This should be become clearer by referring to FIG. 2.

The central processor unit 1 is connected inside the processor system to two databuses 9 and 10, the databus 9 having a higher transmission rate than the databus 10. The processor unit 1 can only access the databus 9 with its executing unit 7, while the executing unit 5 which is designed in general can use both databuses 5, 7. To implement fast data transfers, especially to move the so-called payload data of communications protocols, which comprise the actual communication information, input- and output ports 11 as well as buffers or registers 12 are connected to the fast databus 9. The ports 11 are designed as more complex special registers and serve as the interface to a transceiver 14, also described as a modulator, of the corresponding communication transmitter, via which data is transmitted or received. An interrupt controller 16 in particular evaluates interrupt signals generated by the ports 11 and, depending on this in agreement with a preset interrupt handling, actuates the central processor unit 1. The buffers 12 form the interface to the particular host system 15 (i.e. the particular communication transmitter, router or gateway), which writes to or reads out from the buffer 12 the bitstream to be transmitted or received. The buffers 12 for example designed as RAM memories can be controlled via DMA controllers configurable by the processor unit 1 so that the data transfers between the buffers 12 and the host system 15 puts no significant burden on the processor unit 1. The slower databus 10 on the other hand is linked with the actual data memory 13 of the processor system, which is designed in the form of a RAM mass memory and preferably serves to temporarily store the control data and header information of a communications protocol.

In this way the components 11, 12 provided for processing communications protocols to transfer so-called payload data are separated from the section provided for processing the protocol-header data, and the executing unit 7 as well as the fast databus 9 are used so that the payload data can be transferred quickly, while the header data of the particular communications protocol can be processed via the slower databus 10 (and the executing unit 5) in parallel with this.

The signals fed to a port 11 with serial data input and parallel data output are represented in FIG. 3A. This port 11 receives serial input data D_IN, which is written to the port 11 according to a clock signal CLK. In addition the port 11 receives 3 bit control information BP, which describes the bit position of the data to be written, as well as further 3 bit control information BW, which describes the width or length of the bit field to be written. In this way a data block of the length BW with a bitoffset of the length BP related to the first bit position of the port 11 is written to the port 11. As a further control signal a reset signal RESET is fed to the port 11. On the output side the data with n bits is read out in parallel, reading out of the data being released via a further control signal D_READ. Furthermore an interrupt signal D_READY is provided, which produces an interrupt, if data is stored in the port 11.

The signals fed to a port 11 with parallel data input and serial data output are shown in FIG. 3B, this port only being distinguished from the port shown in FIG. 3A in that on the input side n-bits are read in in parallel and the output data is output in series.

Finally the signals fed to a buffer or register 12 are also shown in FIG. 3C, data elements in the form of bytes preferably being written to and read out from the buffer 12. In addition an address signal ADR is defined, which in each case describes the address of the buffer 12, which has to be accessed.

The invention claimed is:

1. Processor system,
    with a processor unit for executing instructions filed in a program memory,
    whereby the processor unit comprises instruction read out means for reading out an instruction from the program memory, instruction decoding means for decoding the instruction, and instruction executing means for executing the instruction,
    whereby the instruction executing means comprise a plurality of executing units for parallel execution of various instructions, and the instruction read out means and the instruction decoding means are jointly provided for all executing units,
    whereby a first executing unit of the plurality of executing units is connected to a first databus, the first executing unit being configured to execute all instructions of a set of instructions of the processor system, while a second executing unit of the plurality of executing units is connected to a second databus, the second executing unit being configured to execute only a few special instructions of the instruction set of the processor system, the first databus having a lower transmission rate than the second databus, and
    whereby the processor unit includes a path leading to the first executing unit that is temporarily deactivated by the instruction read out means via the instructions decoding means, if momentarily no instruction has to be executed by the first executing unit.

2. Processor system according to claim 1, wherein temporary storage means for storing information required for executing the instruction to be carried out by the particular executing unit are associated with each executing unit.

3. Processor system according to claim 2 wherein information stored in the temporary storage means associated with the second executing unit comprises a storage or loading address of the datablock to be stored or loaded, the amount of data elements of the datablock to be moved, an offset value, with which the datablock has to be stored or read and/or control information, which specifies whether the instruction to be carried out concerns a storage or read instruction.

4. Processor system according to claim 1, wherein the second executing unit is designed to execute only an instruction to move a data block.

5. Processor system according to claim 1 wherein the processor system is intended for processing telecommunications protocols, and the first databus is intended for processing header data of the telecommunications protocols, while the second databus is intended for fast transfer of payload data.

6. Processor system according to claim 1 wherein a data memory of the processor system is connected to the first databus, and at least one input and/or output port and/or at least one register or buffer is connected to the second databus.

7. Processor system according to claim 6, wherein the input and/or output port connected to the second databus is connected to a transmitter and/or receiver unit of a communication transmitter, and the register or buffer connected to the second databus is provided for temporary storage of a bitstream to be transmitted or received by the communication transmitter.

8. Processor system according to claim 1, wherein the executing unit of the instruction executing means connected to the first databus corresponds to the first executing unit and the executing unit connected to the second databus corresponds to the second executing unit.

9. Processor system according to claim 8, wherein the first executing unit is also connected to the second databus, so that it can also access the second databus, while the second executing unit is only connected to the second databus.

10. Processor system according to claim 1, wherein the second executing unit is designed to execute only one type of the special instructions.

* * * * *